(12) United States Patent
Hakobyan et al.

(10) Patent No.: US 11,199,617 B2
(45) Date of Patent: Dec. 14, 2021

(54) RADAR SENSOR FOR MOTOR VEHICLES

(71) Applicant: Robert Bosch GmbH, Stuttgart (DE)

(72) Inventors: Gor Hakobyan, Stuttgart (DE); Karim Adel Dawood Armanious, Stuttgart (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 287 days.

(21) Appl. No.: 16/343,856

(22) PCT Filed: Sep. 12, 2017

(86) PCT No.: PCT/EP2017/072837
§ 371 (c)(1),
(2) Date: Apr. 22, 2019

(87) PCT Pub. No.: WO2018/086783
PCT Pub. Date: May 17, 2018

(65) Prior Publication Data
US 2019/0265346 A1     Aug. 29, 2019

(30) Foreign Application Priority Data
Nov. 9, 2016 (DE) .......................... 102016221947.2

(51) Int. Cl.
    *G01S 13/34*     (2006.01)
    *G01S 7/02*     (2006.01)
    *G01S 13/931*     (2020.01)
    *G01S 7/35*     (2006.01)

(52) U.S. Cl.
    CPC ............ *G01S 13/347* (2013.01); *G01S 7/023* (2013.01); *G01S 13/343* (2013.01); *G01S 13/931* (2013.01); *G01S 7/356* (2021.05)

(58) Field of Classification Search
CPC .... G01S 13/931; G01S 13/343; G01S 13/584; G01S 13/345; G01S 13/347; G01S 7/023; G01S 7/23; G01S 2007/356
(Continued)

(56) References Cited

U.S. PATENT DOCUMENTS 3,593,159 A * 7/1971 Kaplan ..................... H03K 3/80
    330/63
7,071,868 B2 * 7/2006 Woodington ........... G01S 7/354
    342/70
(Continued)

FOREIGN PATENT DOCUMENTS

DE     102013200404 A1     7/2014
DE     102013212090 A1     1/2015
(Continued)

OTHER PUBLICATIONS

International Search Report for PCT/EP2017/072837, dated Dec. 12, 2017.

*Primary Examiner* — Erin F Heard
*Assistant Examiner* — Michael W Justice
(74) *Attorney, Agent, or Firm* — Norton Rose Fulbright US LLP; Gerard Messina

(57) ABSTRACT

A radar sensor for motor vehicles, having a signal generator that is configured to generate a radar signal that contains a cyclically repeating sequence of N wave trains, where $j=1, \ldots, N$, which are transmitted successively at time intervals $T'_{c,j}$ and which occupy respective frequency bands that differ from one another in terms of their center frequencies $f_{c,j}$, wherein the relationship applicable to the time intervals $T'_{c,j}$ and the center frequencies $f_{c,j}$ is: $T'_{c,j} * f_{c,j} = X$, where the parameter X is constant.

8 Claims, 5 Drawing Sheets

(58) Field of Classification Search
USPC .................... 342/200, 201, 70, 60, 175, 199
See application file for complete search history.

(56) References Cited

U.S. PATENT DOCUMENTS

| | | | | |
|---|---|---|---|---|
| 7,423,958 | B2* | 9/2008 | Schrader | H04L 27/2626 370/204 |
| 8,081,105 | B2* | 12/2011 | Tigrek | H04L 27/2607 342/105 |
| 10,012,726 | B2* | 7/2018 | Schoor | G01S 13/345 |
| 2007/0200747 | A1* | 8/2007 | Okai | G01S 7/36 342/70 |
| 2009/0237292 | A1* | 9/2009 | Tigrek | H04L 27/2607 342/109 |
| 2012/0169523 | A1* | 7/2012 | Lee | G01S 13/345 342/21 |
| 2014/0022111 | A1* | 1/2014 | Kuehnle | G01S 13/584 342/109 |
| 2015/0002332 | A1* | 1/2015 | Bi | G01S 7/35 342/200 |

FOREIGN PATENT DOCUMENTS

| | | |
|---|---|---|
| DE | 102014226030 A1 | 6/2016 |
| DE | 102015202874 A1 | 8/2016 |
| WO | 2014075838 A1 | 5/2014 |
| WO | 2014195046 A1 | 12/2014 |
| WO | 2015197226 A1 | 12/2015 |
| WO | 2017118632 A1 | 7/2017 |

* cited by examiner

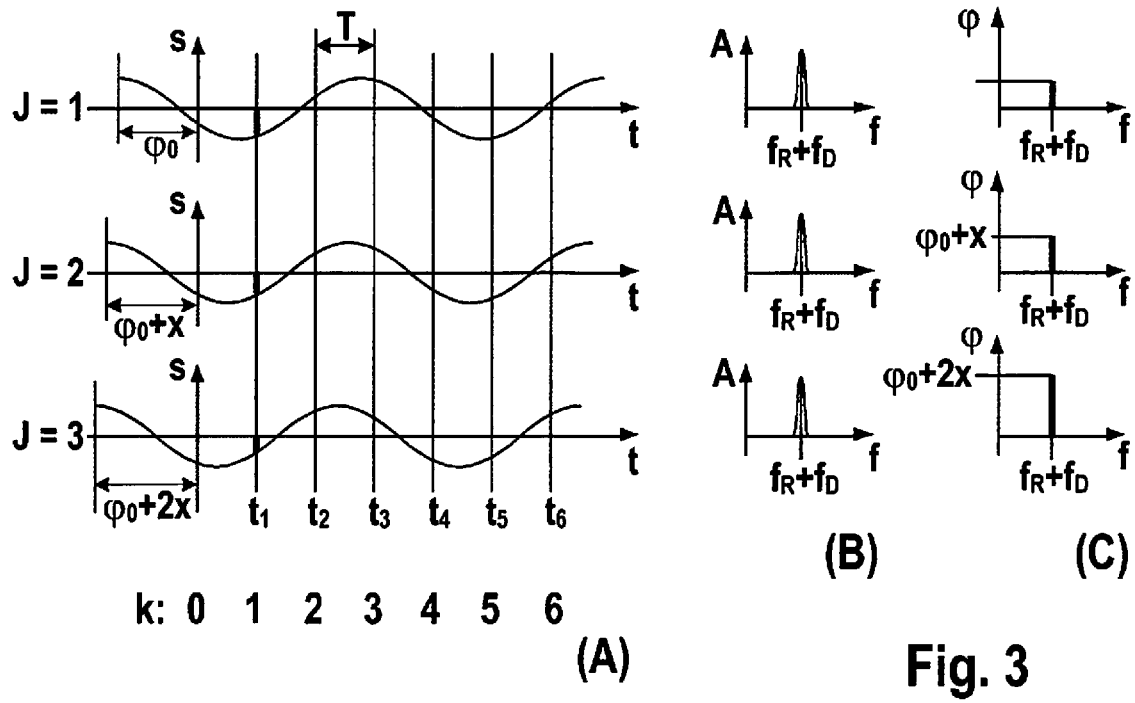
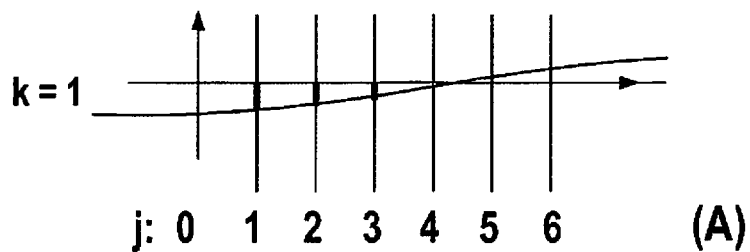
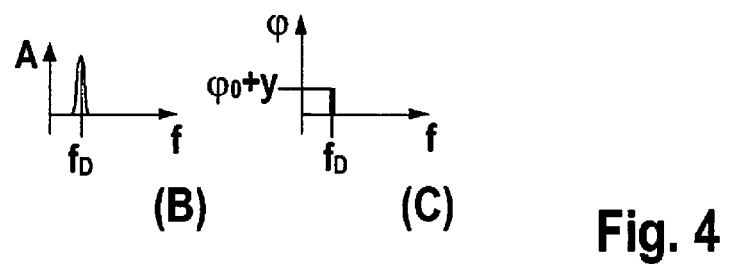
Fig. 4

RADAR SENSOR FOR MOTOR VEHICLES

FIELD

The present invention relates to a radar sensor for motor vehicles, having a signal generator that is configured to generate a radar signal that contains a cyclically repeating sequence of N wave trains $W_j$, where j=1, ..., N, which are transmitted successively at time intervals $T"_{c,j}$ and which occupy respective frequency bands that differ from one another in terms of their center frequencies $f_{c,j}$.

BACKGROUND INFORMATION

Radar systems for measuring a distance, relative speed, and angle of objects (for example, vehicles and obstacles) are increasingly being used in motor vehicles for safety functions and convenience functions. The accuracy of radar measurements in terms of distance, speed, and angle plays an increasingly important role here, since driver assistance systems and autonomous driving functions require maximally accurate environmental detection.

A further important criterion is the separation capability of the radar sensor in all three parameters, i.e., the ability to distinguish two closely spaced targets from one another in a given dimension. A fundamental principle is that the separation capability of the radar in distance depends only on the effective bandwidth, that speed separation capability is dependent on measurement time, and that angle separation capability correlates with the size of the antenna aperture. Wider bandwidths should therefore be worked with in order to improve distance separation capability, while longer measurement times are necessary for improved speed separation capability. Greater bandwidth requires an increase in analog to digital converter (ADC) rates, and increases computation complexity. An increase in distance separation capability can also be achieved by shifting the carrier frequency during measurement, and thus effectively enlarging the frequency band used for measurement.

For angle estimation, increasing use is being made of multiple input, multiple output (MIMO) systems, in which multiple receiving and transmitting antennas are used. With the aid of the MIMO process it is possible especially to perform particularly accurate angle measurements, the antenna aperture (antenna area), which is important for angle measurement, being enlarged virtually. In this context, multiple transmitting antennas emit their signals without influencing one another, and those signals are separated in the receiving channels. The virtual aperture enlargement is brought about by the fact that the spacings of the transmitting antennas from the receiving antennas are different, and it is thus possible to proceed computationally as if only one transmitting antenna were present, but the number of receiving antennas is multiplied and thus results, virtually, in a larger antenna aperture. In order to enable interference-free operation of multiple transmitting antennas, they should be separated, for example, in terms of time (time-division multiplexing (TDM)) or in terms of frequency (frequency-division multiplexing (FDM)).

The statements above apply regardless of the modulation method used. Typical transmission frequencies nowadays are 24 GHz or 77 GHz; the maximum bandwidths that can be occupied are <4 GHz but are typically much narrower (e.g. 0.5 GHz).

Present-day motor vehicle radar systems generally utilize frequency-modulated continuous wave (FMCW) modulation, in which multiple linear frequency ramps having different slopes are cycled through successively. Mixing the instantaneous transmitted signal with the received signal yields a low-frequency signal whose frequency is proportional to distance but which still contains an additive/subtractive component as a result of a Doppler frequency that is proportional to the relative speed. The distance and speed information for multiple targets is separated out using a complex procedure in which the results of the various ramps are associated (or "matched") with one another.

More-recent systems are based on FMCW modulation with considerably faster ramps (fast-chirp modulation or chirp-sequence modulation), with the result that the Doppler shift within a ramp becomes negligible. The distance information obtained is largely unequivocal, and a Doppler shift can then be determined by observing the development over time of the phase of the complex distance signal. Distance and speed are determined mutually independently, as a rule by two-dimensional Fourier transformation.

PCT Application Nos. WO 2014/075838 A1 and WO 2015/197226 A1 describe specific implementations of fast-chirp modulation which deliberately cause an ambiguity in the speed estimate by way of wider time intervals in the equidistant ramp sequences of the radar signals. These ambiguities are resolved by utilizing multiple equidistant sequences of the radar signals after two-dimensional Fourier evaluation, thereby re-establishing unambiguity in the desired speed range. This approach has the advantage that the duration of the transmitted ramps can be increased so that, for example, the ramp slope can be reduced, with the result that ADC rates and computation outlay decrease.

In the future, digitally generated modulation methods will also play an important role in motor vehicle radar systems. Digital modulation methods such as orthogonal frequency division multiplex (OFDM) are already being successfully used for communication purposes today in many applications (WLAN, LTE, DVB-T). Several dissertations and publications regarding radar systems with digital modulation which are modeled on the basic OFDM principle are available. These papers use OFDM symbols transmitted sequentially one after another, with the result that, similarly to fast-chirp systems, speed evaluation and distance evaluation can be carried out mutually independently. A two-dimensional Fourier transform can be used for this; the transmitted modulation symbols must first be eliminated. Alternatively, the speed measurement can be carried out by Fourier transformation and the distance measurement by "matched filtering."

Fast-chirp and OFDM radar systems share a common measurement principle for measuring speed and distance. In both systems, what is produced after analog or digital demodulation is a two-dimensional oscillation whose frequency is proportional in one dimension to the distance and in another dimension to the Doppler frequency, i.e., the relative speed, of the targets. Two-dimensional Fourier transformation is therefore typically used with both systems for evaluating distance and speed. Both the Doppler frequency and the initial phase of the received signal are correlated with the carrier frequency.

As a consequence, the change in the carrier frequency during measurement results in a change in the phase profile in the course of the wave train (referred to hereinafter as the "slow time"), and thus influences the Fourier evaluation in that dimension. While the existing art has disclosed approaches to fast-chirp modulation from whose dependency additional information for improved speed estimation can be obtained by a linear change in the carrier frequency (e.g., German Patent Application No. DE 10 2013 200 404

A1), the speed estimate is negatively influenced thereby. This approach for fast-chirp systems therefore represents a compromise between improving the distance estimate and degrading the speed estimate.

Cognitive radar approaches are also becoming more and more significant, since the number of radar sensors in the automotive sector is continually increasing and the probability of interference resulting from other radar sensors thus rises. With a cognitive approach, the radar is intended to be able to adjust adaptively to the environment so that, inter alia, it can react to interference from other radar sensors and thereby avoid it as much as possible. The adaptation can occur from one measurement cycle to the next by adapting the carrier frequency, or also within one measurement cycle, for example by adapting the carrier frequencies of individual radar wave trains (ramps, OFDM symbols, etc.). Here as well, the problem occurs that the phase profile over the slow time depends on the carrier frequency, on the distance, and on the speed, and the change in carrier frequency results in a nonlinear change in phase. The consequence is that the speed estimate (for instance, using Fourier evaluation) becomes degraded or is not possible at all.

SUMMARY

An object of the present invention is to provide a method that allows distances and relative speeds to be measured unequivocally and with even greater accuracy.

The starting point of the present invention is a radar sensor of the kind described in German Patent Application No. DE 10 2013 200 404 A1. In this radar sensor, the successive wave trains are constituted by the individual frequency ramps. These frequency ramps are, however, equidistant, i.e., the points in time at which the wave trains are transmitted are separated from one another by fixed and identical time intervals.

The object may be achieved according to the present invention by the fact that the relationship applicable to the time intervals $T'_{c,j}$ and the center frequencies $f_{c,j}$ is:

$$T'_{c,j} * f_{c,j} = X$$

where the parameter X is constant.

In the radar sensor according to the present invention, the individual wave trains, which, for example as in the related art, can be constituted by frequency ramps having a constant and identical slope and identical frequency excursion, or, e.g., also by OFDM symbols, are no longer equidistant, but instead the transmission times are varied as a function of the respective center frequency, in such a way that the aforementioned relationship is satisfied. The consequence is that the product of the transmission time $T_j$ of the j-th wave train and the center frequency $f_{c,j}$, which determines the phase profile over the slow time, is a linear function of the ramp index j. The result is to eliminate from the phase profile the nonlinearities that are produced in the related art by the variation in the center frequencies $f_{c,j}$ and that would result, in the context of a Fourier transform over the slow time, i.e., over the index j, in a broadened peak and thus in a degradation of measurement accuracy and separation capability, in particular in terms of speed measurement.

The present invention thus makes it possible to vary the center frequencies as necessary, for example in order to optimize measurement accuracy and separation capability in the context of distance measurement or, in a cognitive radar system, to avoid interference from other radar signals, without having to consider what effect those changes in center frequency might have on the speed measurement.

The term "center frequency" serves here to characterize the frequency location of the relevant wave train. This term was selected only for its comprehensibility, and is not to be construed to mean that the "center frequency" must obligatorily be located exactly at the center between the lowest frequency and highest frequency of the wave train. All that is required is that the center frequencies be defined by points in the frequency band which correspond to one another in the various wave trains.

The sequence of transmission times $T_j$ determines the time intervals $T'_{c,j}$ between the individual wave trains or ramps. For example, one can define as a transmission time in each wave train that point in time at which the frequency of the transmitted signal passes through the center frequency. The starting point or end point of the wave train could, however, also just as easily be regarded as a transmission time.

Advantageous embodiments of the present invention are described herein.

An exemplifying embodiment is explained in further detail below with reference to the figures.

BRIEF DESCRIPTION OF THE DRAWINGS

FIG. 3 shows a sequence of intermediate-frequency/time signals and their Fourier transforms.

FIG. 4 shows a longitudinal section through the time signals according to FIG. 3, and the Fourier transforms of that longitudinal section.

DETAILED DESCRIPTION OF EXAMPLE EMBODIMENTS

Figure 1:
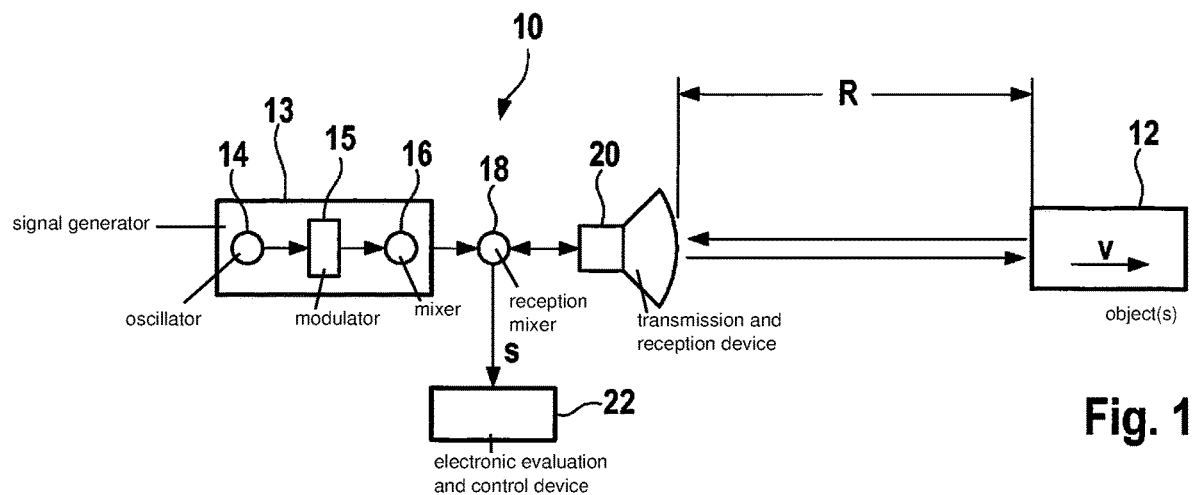
FIG. 1 is a block diagram of an FMCW radar system.

FIG. 1 is a simplified block diagram depicting an FMCW radar sensor 10 that, for example, is installed at the front of a motor vehicle and serves to measure distances R and relative speeds v of objects 12, for example of preceding vehicles. Radar sensor 10 has a signal generator 13 having an oscillator 14, a modulator 15, and a mixer 16 that mixes wave trains generated by the modulator up into a high-frequency band by mixing with a respective carrier frequency, and thereby generates a radar signal that is to be transmitted. Alternatively, signal generation can occur, depending on the wave train, directly with the aid of an oscillator. This radar signal is then supplied via a transmission and reception mixer 18 to a transmission and reception device 20, from which the signal is sent out toward object 12. The signal reflected at the object is received by transmission and reception device 20 and mixed, in transmission and reception mixer 18, with a portion of the transmitted signal. An intermediate-frequency signal s is thereby obtained, and is evaluated further in an electronic evaluation and control device 22.

Figure 2:
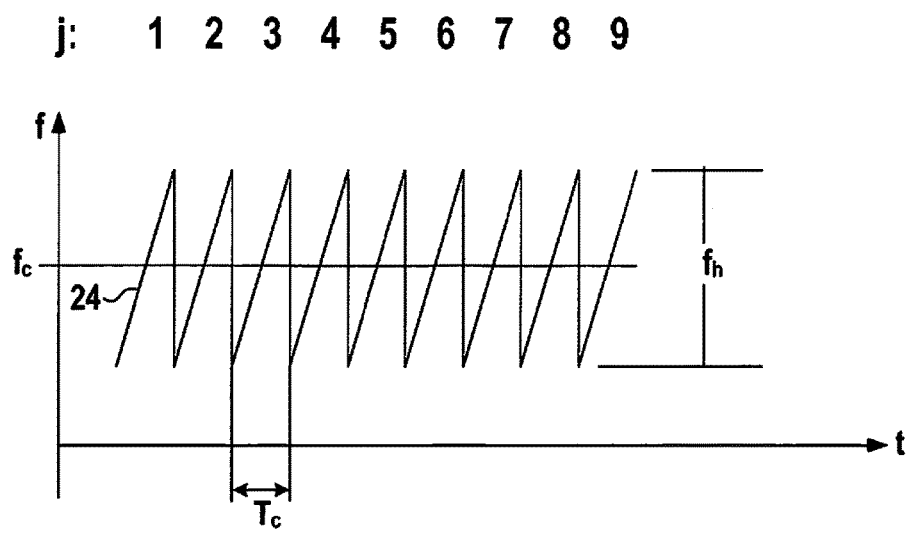
FIG. 2 shows an example of a frequency modulation pattern.

FIG. 2 shows an example of a modulation pattern of the transmitted signal supplied by signal generator 13. The frequency f of the transmitted signal is plotted here as a function of time t. The frequency is modulated in the form of successive identical wave trains that will also be referred to hereinafter as "ramps" 24. Ramps 24 are serially numbered in FIG. 2 with an index j. The central frequency (center frequency $f_c$) of the transmitted signal is on the order of 76 GHz, and the frequency excursion $f_h$ over which the frequency changes in the course of each ramp is on the order of several MHz to a few GHz. The time interval $T'_c$ at which ramps 24 follow one another is on the order of several microseconds to a few milliseconds. Because, in the example shown, ramps 24 follow one another without an off time, $T'_c$ simultaneously defines the ramp duration $T_c$.

The frequency of the intermediate-frequency signal s corresponds to the frequency difference between the transmitted signal, which is conveyed from transmission and reception mixer 18 to transmission and reception device 20, and the signal that was received by transmission and reception device 20 after reflection from object 12 and arrives back at transmission and reception mixer 18. This frequency difference is made up additively of a distance-dependent component $f_R$ and a speed-dependent component $f_v$. The distance-dependent component $f_R$ results from the frequency modulation and is defined in the example shown here as:

$$f_R = 2R f_h / (c T_c) \quad (1)$$

where c is the speed of light. The speed-dependent component results from the Doppler effect and is defined approximately as:

$$f_D = 2 f_c v / c \quad (2)$$

FIG. 3(A) depicts the intermediate-frequency signals s for the first three ramps j=1 to j=3 as functions of time t (time signals), on the assumption that only a single object is being localized. In the evaluation and control device, the time signal supplied as an analog signal from mixer 18 is sampled periodically at sampling times $t_1$, $t_2$, . . . , digitized, and stored. The sampling times are synchronized with the modulation ramps of the transmitted signal and numbered within each ramp with the index k. The sampling period, i.e. the time interval between the individual sampling times, is designated T.

The time signal for each ramp can be converted by a fast Fourier transform (FFT) into a spectrum that indicates the (complex) amplitude of the intermediate-frequency signal as a function of frequency f. FIGS. 3(B) and 3(C) depict, for each of the three ramps, two small diagrams that indicate the absolute magnitude A and the phase ϕ as a function of frequency f.

Assuming that only a single object is present, the spectrum acquired over a single ramp exhibits a sharp peak 26 at a frequency $f_R+f_D$. Because of the short time interval $T'_c$ between the ramps, the frequencies $f_R+f_D$ remain practically unchanged, so that peak 26 is located at the same point in all three of the spectra shown in FIG. 3(B).

If the relative speed of the object is not equal to zero, however, the slight change in the distance of the object which occurs within ramp duration $T_c$ results in a phase shift of the intermediate-frequency signal, as depicted in FIG. 3A. The phase increases by a specific amount x from one ramp to the next. If the phase at the first ramp (j=1) is designated $\phi_0$, then for equidistant ramp intervals the phase at the second ramp (j=2) has the value $\phi_0+x$ and at the third ramp (j=3) has the value $\phi_0+2x$.

In general, the intermediate-frequency signal s as a function of the sampling index k and ramp index j can be described as follows:

$$s(k,j) = \exp(i(\phi_0 + 2\pi(f_R+f_D)kT + 2\pi f_D(j-1)T'_c)) \quad (3)$$

The term $(f_R+f_D)$ k T represents the transit-time and Doppler effects within a single ramp. The term $f_D(j-1)T'_c$ represents the effect of the slight change in object distance from one ramp to the next, and depends only on the speed-dependent component $f_D$ (the Doppler frequency). The value $\phi_0$ is a phase offset that is defined here as:

$$\phi_0 = 4\pi R f_c / c \quad (4)$$

where $f_c$ is the center frequency of the frequency ramps. Inserting equation (4) into equation (3) yields:

$$s(k,j) = \exp(i(4\pi R f_c/c + 2\pi(f_R+f_D)kT + 2\pi f_D(j-1)T'_c)) \quad (5)$$

If a Fourier transform is performed, as in FIG. 3, only within a respective individual ramp (over the index k for a fixed j), the term $f_D(j-1)T'_c$ in equation (3) then yields in each case only a contribution x, 2x, . . . to the phase.

A Fourier transform can also be performed, however, over a "longitudinal section" of the time signals, by keeping the sample index k constant and performing the fast Fourier transform over the serial ramp index j (over the so-called "slow time"). This is depicted in FIG. 4 symbolically for the sample index k=1. In FIG. 3, the function values at the sampling time $t_1$ are depicted as thick bars. The same bars are also shown in FIG. 4(A), but here they are plotted against the ramp index j. Because of the phase offset from one ramp to the next, a periodic function is once again obtained and can be subjected to a Fourier transform. The result is depicted in FIGS. 4(B) and (C), once again as a diagram of the absolute magnitude A and phase ϕ of the complex amplitude. In the context of a single object, these Fourier transforms, which can be performed for each k, yield a sharp peak at the Doppler frequency $f_D$. The phase is made up of the phase offset $\phi_0$ and a component $y=(f_R+f_D)$ k T.

Only the frequency components $f_R$ and $f_D$ are needed in order to calculate the distance R and relative speed v of the object. As FIG. 4 shows, the spectra that are obtained by a Fourier transform over the ramp index j yield the frequency component $f_D$, while the Fourier transform within each individual ramp as shown in FIG. 3 yields the sum $f_R+f_D$ of the frequency components. The frequency component $f_R$, and thus the distance R, can then be calculated from the two variables together.

Figure 5:
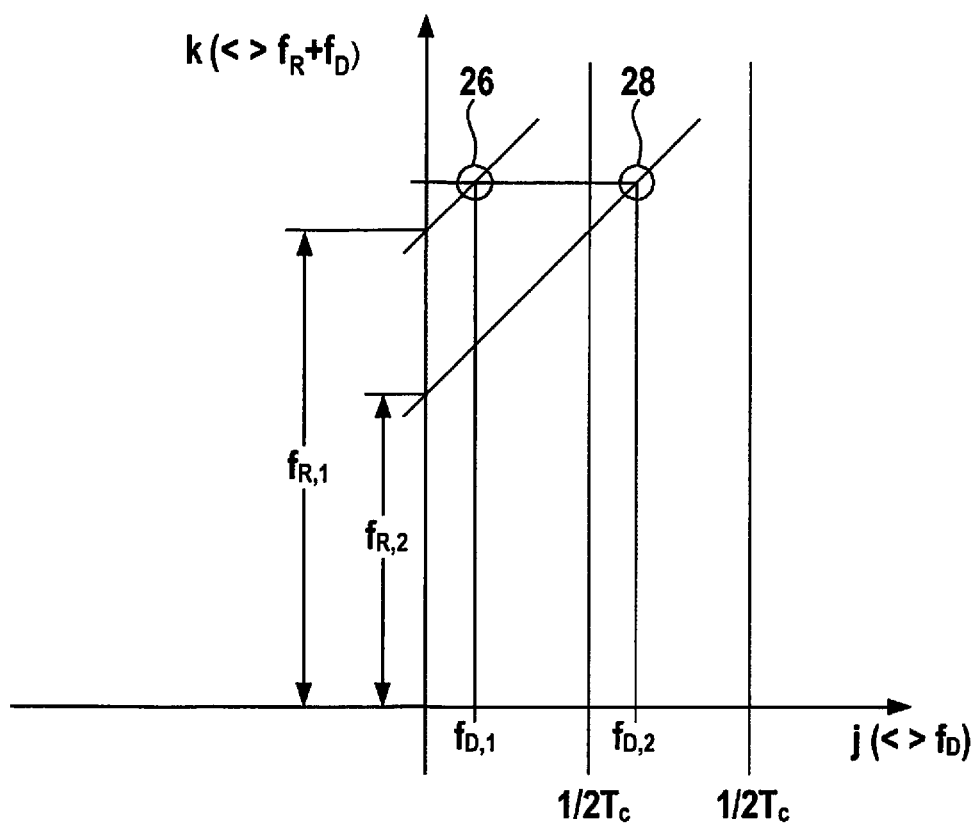
FIG. 5 is a diagram to illustrate the result of a two-dimensional Fourier transform.
Figure 6:
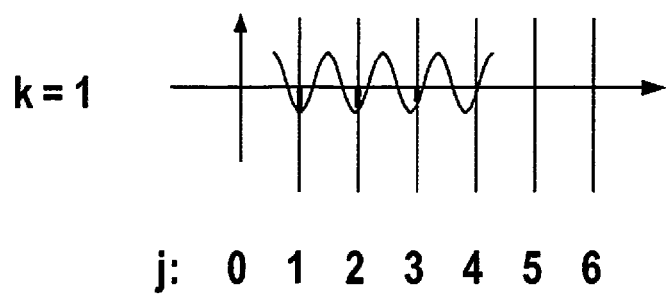
FIG. 6 is a longitudinal section analogous to FIG. 4, for a different relative speed.

A particularly elegant evaluation method involves combining the above-described Fourier transforms into a so-called "two-dimensional" Fourier transform. Here the time signals, obtained on several successive ramps, are transformed into a two-dimensional frequency space whose coordinates are the Doppler frequency $f_D$ and the sum $f_R+f_D$, as shown in FIG. 5. In this two-dimensional frequency space, peak 26 is then located at a position $f_{D,1}$ on the horizontal axis which corresponds to the Doppler frequency and thus to the relative speed v of the object; and its position on the vertical axis is $f_{R,1}+f_{D,1}$. In this diagram, the peaks of objects that are at the same distance (constant $f_R$) but have different relative speeds (variable $f_D$) lie on 45° lines. Where the 45° line that passes through peak 26 intersects the vertical axis, the distance-dependent frequency component $f_{R,1}$ can be read off directly and converted into a relevant distance $R_1$.

Figure 7:
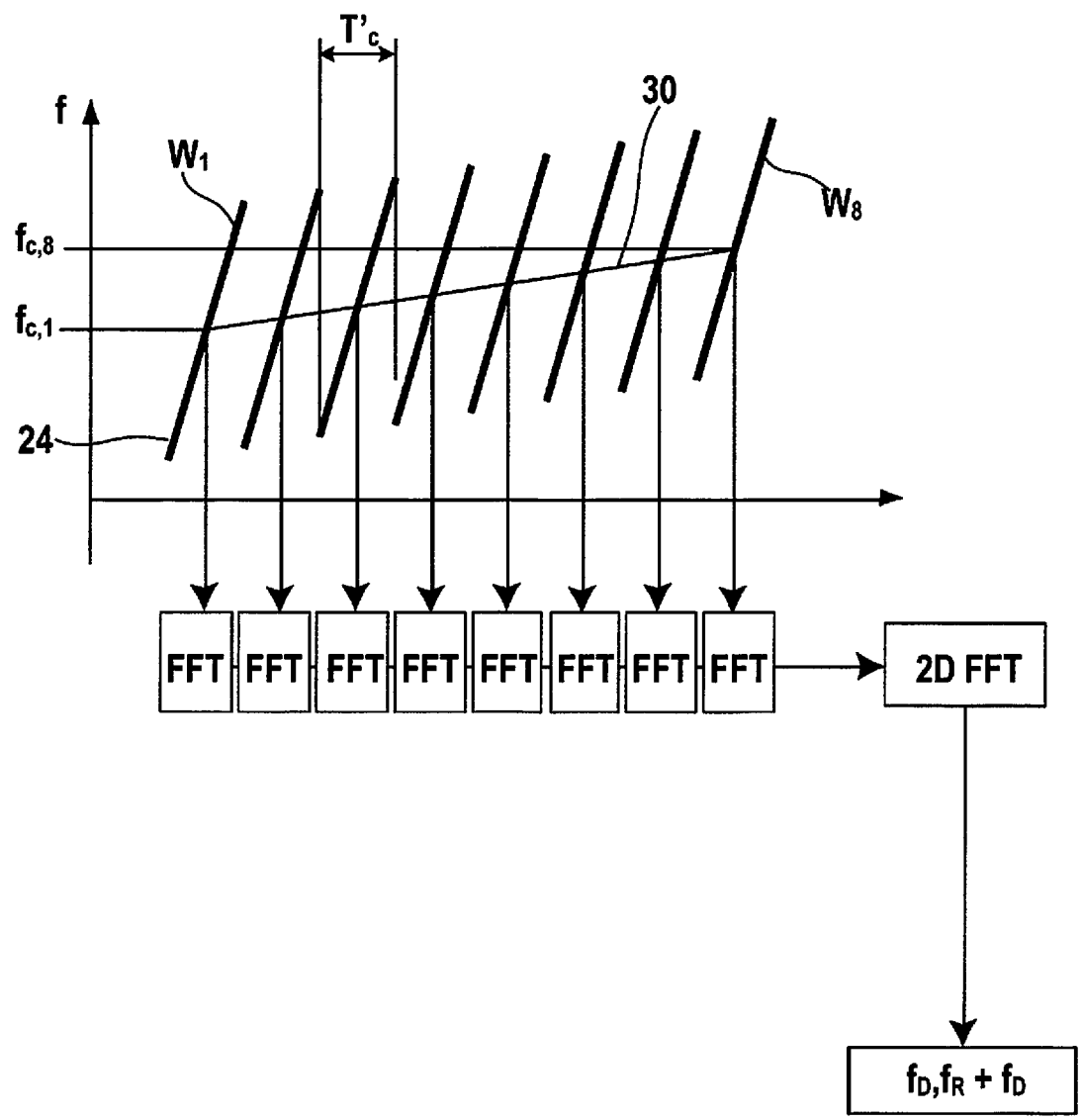
FIG. 7 is a diagram to explain a modulation pattern having varying center frequencies.

It is advantageous to use, instead of the modulation pattern shown in FIG. 2, a modulation pattern that is shown in FIG. 7. With this modulation pattern, the N(=8) successive ramps 24 are frequency-offset from one another. Ramps 24 have the same duration and the same frequency excursion, but are shifted with respect to one another by a fixed frequency spacing $f_s$, so that the following is true of the center frequencies:

$$f_{c,j} = f_{c,j-1} + f_s \qquad (6),$$

so that the sequence of wave trains $W_j$ (where j=1, ..., 8) ("fast" ramps 24) as a whole constitutes a "slow" ramp 30 having a frequency excursion $N\,f_s$ (where N=8 in this example).

Optionally, the individual ramps 24 can each be separated by an off time. In the example shown, however, ramps 24 follow one another without an off time, so that the time interval $T'_c$ is once again equal to the ramp duration $T_c$.

The evaluation procedure described with reference to FIGS. 1 to 3 can then be performed for each individual ramp 24. The intermediate-frequency signals s obtained in that context differ principally in terms of their phase offset. Evaluating that phase offset makes possible an improved distance estimate.

For this purpose, as depicted symbolically in FIG. 7, the time signals that are obtained for the family of ramps 24 are subjected to a two-dimensional fast Fourier transform (2D FFT). Because of the large ramp slope, the distance-dependent term, which is proportional to $f_R + f_D$, predominates in the Fourier transforms over the index k. For a single localized object, this transform yields a peak whose location on the k axis supplies a first correlation between the distance R and speed v of the object. The Fourier transforms over the index j correspond to a measurement on ramp 30 having the lower ramp slope $f_s\,T'_c$ and the longer measurement time $(N-1)\,T'_c$. For the single object, a peak is obtained here whose location on the j axis supplies a second correlation between distance and speed. The best estimate for the distance and speed is then obtained from the requirement that both relationships must be satisfied for the same value pair (R, v). The coordinates $f_D$ and $f_R+f_D$ of the "true" peak 26 in FIG. 5 are thereby obtained.

Shifting the center frequencies on ramp 30 causes the bandwidth as a whole to be increased and thus the distance estimate to be improved, even though the ADC rates for evaluation do not need to be higher than with the modulation pattern in FIG. 2. In the version of the method hitherto described, however, a negative impact on the accuracy of the speed measurement must be accepted. The reason is that the variation in the center frequencies $f_{c,j}$ from one ramp to the next results in nonlinearities in the phase profile (an additional quadratic phase term, in the case of a monotonic development), which degrade measurement accuracy and separation capability when measuring the relative speed.

This is because when the center frequencies vary from one ramp to the next, the variable $f_c$ in equation (2) (which indicates the speed dependence of the Doppler frequency $f_D$) is to be replaced, in each ramp having the index j, with the variable $f_{c,j}$. Inserting equations (1) and (2) into equation (5) then yields the following expression for the intermediate-frequency signal s:

$$s(k,j) = \exp(i(4\pi R f_{c,j}/c + 2\pi(2Rf_h/(cT'_c + 2f_{c,j}v/c)kT + 4\pi f_{c,j}(v/c)(j-1)T'_c)) \qquad (7)$$

If each ramp is increased by the same frequency offset $f_s$, as in the example shown in FIG. 7, the following expression is then obtained for the center frequencies $f_{c,j}$.

$$f_{c,j} = f_{c,1} + (j-1)f_s \qquad (8)$$

Inserting this expression into equation (7), the first two terms $$4\pi R\,f_{c,j}/c = 4\pi R(f_{c,1} + (j-1)f_s)/c \qquad (9)$$

and $$4\pi(Rf_h/(cT'_c + f_{c,j}v/c)kT = 4\pi(Rf_h/(cT'_c + (f_{c,1} + (j-1)f_s)v/c)kT \qquad (10)$$

are then linear in j. What is obtained for the third term, however, is:

$$4\pi(f_{c,j}v/c)(j-1)T'_c = 4\pi((f_{c,1} + (j-1)f_s)v/c)(j-1)T'_c = 4\pi(v/c)T'_c(-f_{c,1} + f_s + (f_{c,1} - 2f_s)j + f_s j^2) \qquad (11)$$

Figure 8:
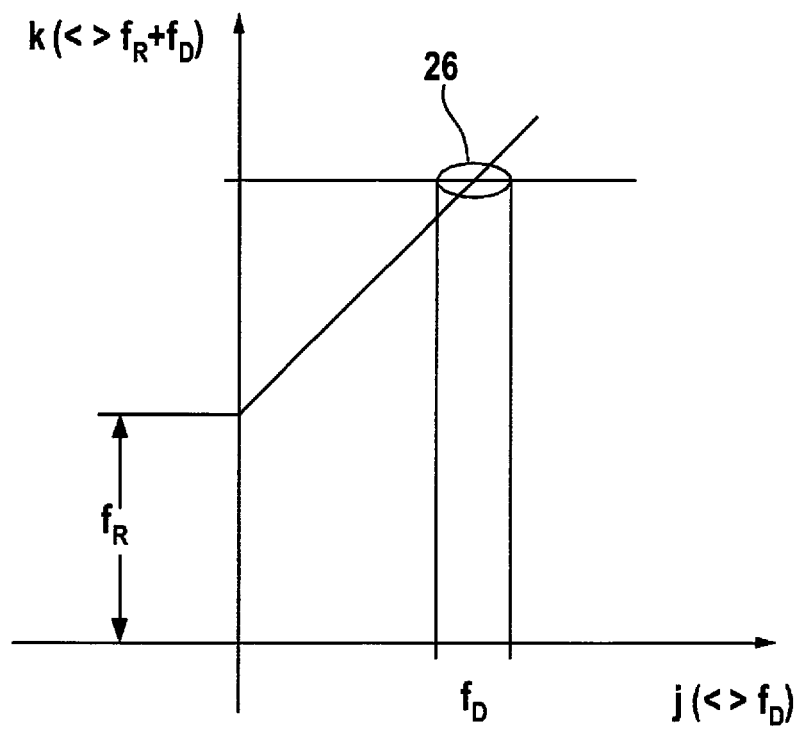
FIG. 8 is a diagram analogous to FIG. 5 to illustrate the effect of the modulation pattern according to FIG. 7.

This term also contains, in addition to a component proportional to the index j, a component that is proportional to $j^2$. The phase profile described by this term is therefore nonlinear in j. Upon Fourier transformation over the ramp index j, this results in a broadened peak in the $f_R+f_D/f_D$ diagram, as shown in FIG. 8. The Doppler frequency $f_D$, and thus the relative speed, can therefore be determined only within a relative wide accuracy range, and separation capability is correspondingly also reduced for two objects having very similar relative speeds, since the relevant peaks can no longer be distinguished from one another. The accuracy of the distance estimate is also impaired by this effect, with the result that limits must be placed on the enlargement of the frequency offset $f_s$.

To avoid this effect, in a refinement according to the present invention of the method described above, not only the center frequencies $f_{c,j}$ but also the associated transmission times $T_j$ of the individual wave trains $W_j$ are varied, and thus also the time intervals $T'_c$ at which ramps 24 succeed one another.

Specifically, the transmission times $T_j = T_{j-1} + T'_{c,j}$ are selected so that the time intervals $T'_{c,j}$ between the wave trains satisfy the following relationship:

$$T'_{c,j} * f_{c,j} = X \qquad (12)$$

where X is a parameter that is constant for the entire measurement cycle, i.e. for all N wave trains, and can be selected appropriately depending on the intended purpose. $T_0 = -T'_{c,1}$ can be defined as a reference time for the first wave train.

Equation (12) then supplies for the third term, instead of equation (11):

$$4\pi f_{c,j}(v/c)(j-1)T'_c = 4\pi(v/c)(j-1)Xj \qquad (13)$$

For all wave trains $W_j$, the phase term as well is therefore a linear function of the index j.

The condition defined in equation (12) thus ensures that the phase profile becomes linearized and, correspondingly, that the peak broadening upon Fourier transformation over j is avoided. This provides additional leeway for selecting the center frequencies $f_{c,j}$ of the individual wave trains; this can be used, for example, to improve the accuracy of the distance estimate with no need to compromise in terms of the speed estimate.

Figure 9:
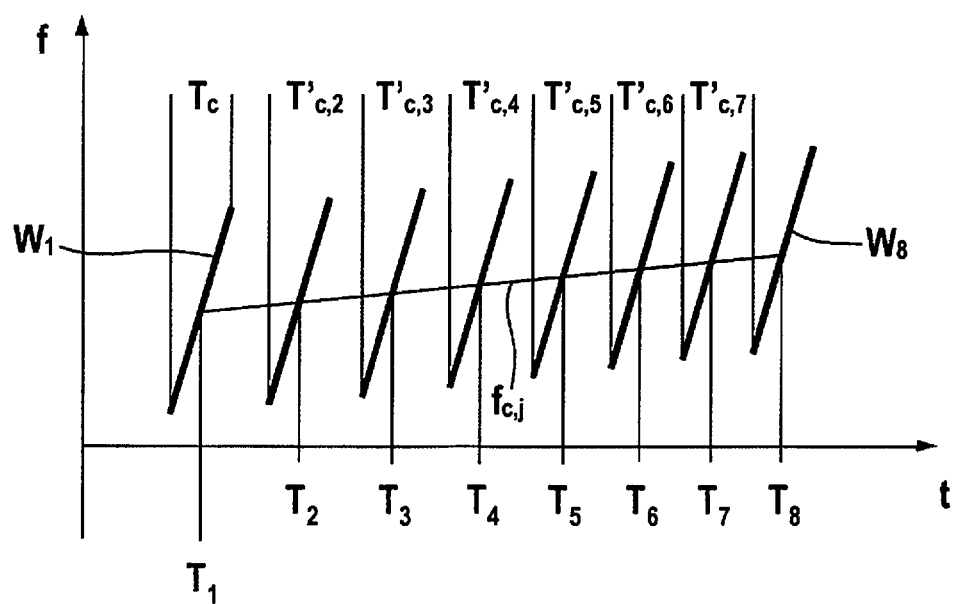
FIG. 9 is a diagram to explain a modulation pattern according to the present invention.

FIG. 9 depicts the modulation pattern according to the present invention in diagram form. The intervals $T'_{c,j}$ (shown here for j=2, ..., 7) are not identical, but instead increase in this example from one wave train to the next, thereby compensating for the increase in the center frequencies $f_{c,j}$. The first interval $T'_{c,1}$ is selected to be large enough that even for the smallest (here, the last) interval, the condition that the interval length be longer than the ramp duration $T_c$ is still met.

In this example, the transmission times $T_1$ to $T_8$ are defined as the points in time at which the frequency of the transmitted signal on the respective ramp reaches the center frequency. If all the ramps have the same slope and the same frequency excursion, as in this example, the beginning of each ramp or the end of each ramp could also, for example, be defined equivalently as a transmission time. In a more general case in which the ramps have different slopes and/or a different frequency excursion, or are nonlinear, the times for the beginning of each ramp would need to be selected so that the relation in accordance with equation (15) is satisfied for the points in time at which each frequency reaches the center frequency.

While in this example the individual wave trains $W_j$ are separated by off times, in a different embodiment the transmission times $T_j$ could, for example, also be varied by varying the ramp duration $T_c$.

The present invention is nevertheless not restricted to ramp-shaped modulation patterns, but can be utilized with a different modulation pattern that embodies the same evaluation principle for estimating distance and speed by two-dimensional frequency analysis (e.g., OFDM radar).

The method described above offers a high degree of flexibility in terms of selecting the center frequencies for the successive wave trains. It can therefore be utilized advantageously in any instance in which the center frequencies need to be varied for any reason, for example including cases in which, in cognitive radar sensors, interference with radar signals of other radar sources is to be avoided by modifying the center frequencies. The radar sensor can also encompass several transmitting and/or receiving antennas, and in particular can also be configured as an angularly resolving MIMO radar sensor.

What is claimed is:

1. An apparatus for a motor vehicle, the apparatus comprising:
a radar sensor that includes an oscillator and a transmitter, wherein:
the radar sensor is configured to use the oscillator to generate a radar signal that contains a sequence of wave trains;
the radar sensor is configured to transmit, via the transmitter, the generated wave trains successively at respective time intervals that are each between respective start times of a respective pair of immediately adjacent ones of the wave trains;
the radar sensor is configured to perform the generation of the radar signal and the transmission of the wave trains in a manner by which:
the wave trains occupy respective frequency bands so that respective center frequencies of at least two of the frequency bands differ from each another; and
at least one of the time intervals differs from at least one other of the time intervals so that a product of (a) the respective center frequency of each and every respective one of the wave trains that is followed by another of the wave trains and (b) the respective time interval between that respective one of the wave trains and the other of the wave trains that follows that respective one of the wave trains is constant for all of the wave trains that are followed by another of the wave trains.

2. The radar sensor as recited in claim 1, wherein the radar sensor is an FMCW radar.

3. The radar sensor as recited in claim 1, wherein a frequency profile within each individual wave train of the wave trains is a linear ramp.

4. The radar sensor as recited in claim 3, wherein all of the wave trains have the same frequency excursion.

5. The radar sensor as recited in claim 4, wherein successive ones of the wave trains are separated from one another by off times.

6. The radar sensor as recited in claim 3, wherein all of the wave trains have the same ramp slope.

7. The radar sensor as recited in claim 1, wherein the radar sensor is an orthogonal frequency division multiplex (OFDM) radar.

8. The radar sensor as recited in claim 1, wherein the radar sensor is configured to detect presence of interfering signals and change the center frequencies to avoid interference by the interfering signals, and change the time intervals based on the change to the center frequencies.

* * * * *